US012803391B2

(12) United States Patent
Choi

(10) Patent No.: US 12,803,391 B2
(45) Date of Patent: Nov. 17, 2026

(54) STATOR ASSEMBLY WITH IMPROVED STRUCTURE FOR INSTALLING SENSOR

(71) Applicant: SHILLA INDUSTRY CO., LTD., Gyeongsangbuk-do (KR)

(72) Inventor: Byoung Sun Choi, Daegu (KR)

(73) Assignee: SHILLA INDUSTRY CO., LTD., Gyeongsangbuk-do (KR)

( * ) Notice: Subject to any disclaimer, the term of this patent is extended or adjusted under 35 U.S.C. 154(b) by 190 days.

(21) Appl. No.: 18/964,816

(22) Filed: Dec. 2, 2024

(65) Prior Publication Data

US 2026/0155712 A1 Jun. 4, 2026

(51) Int. Cl.
*H02K 11/20* (2016.01)

(52) U.S. Cl.
CPC .................................... *H02K 11/20* (2016.01)

(58) Field of Classification Search
CPC . H02K 11/25; H02K 3/00; H02K 3/02; H02K 3/04; H02K 3/12; H02K 3/14; H02K 3/24; H02K 3/48; H02K 3/50; H02K 3/16; H02K 3/28; H02K 3/32; H02K 3/325; H02K 5/10; H02K 5/22; H02K 5/225; H02K 5/135; H02K 11/20; H02K 11/05; H02K 11/30; H02K 11/049; H02K 1/223; H02K 1/226; H02K 1/16; H02K 1/165; H02K 1/146; H02K 1/2786; H02K 15/0031; H02K 15/0062; H02K 15/022; H02K 21/22; H02K 29/598; H02K 29/596
USPC ....... 310/194, 198, 201, 203, 206, 207, 208, 310/68 C
See application file for complete search history.

(56) References Cited

U.S. PATENT DOCUMENTS

| | | | | |
|---|---|---|---|---|
| 2,471,840 | A * | 5/1949 | Seely | H02K 11/25 318/473 |
| 4,188,553 | A * | 2/1980 | Wheaton | H02K 11/25 361/25 |
| 4,571,518 | A * | 2/1986 | Kintz, Jr. | H02K 11/25 310/68 C |
| 5,343,613 | A * | 9/1994 | Kintz | H02K 11/25 310/43 |
| 6,285,105 | B1 * | 9/2001 | Asao | H02K 3/28 310/201 |
| 6,750,582 | B1 * | 6/2004 | Neet | H02K 3/24 310/201 |

(Continued)

FOREIGN PATENT DOCUMENTS

| | | |
|---|---|---|
| KR | 20090019521 | 2/2009 |
| KR | 20110136610 | 12/2011 |

*Primary Examiner* — Maged M Almawri
(74) *Attorney, Agent, or Firm* — IPLA P.A.

(57) ABSTRACT

A stator assembly with an improved structure for installing a sensor, includes: a sensor unit which includes a case body in which a sensor and a component are placed at a predetermined position and a cover sealing the case body; a center core which has a seating part for coupling the sensor unit; a bobbin wherein the center core is inserted into the center; and a coil winding assembly which is formed by winding a coil on the bobbin, wherein in a state in which the sensor unit is coupled to the seating part of the center core of the coil winding assembly, the entire of the sensor unit is overmolded. The sensor and the component for controlling the stator function forms the single sensor unit, thereby preventing contamination by foreign substances.

3 Claims, 6 Drawing Sheets

(56) References Cited

U.S. PATENT DOCUMENTS

| | | | | |
|---|---|---|---|---|
| 6,791,228 | B2 * | 9/2004 | Hashiba | H02K 3/50 310/260 |
| 8,082,653 | B2 * | 12/2011 | Akimoto | H02K 15/021 29/598 |
| 8,519,583 | B2 * | 8/2013 | Sakaue | H02K 3/28 310/71 |
| 9,735,659 | B2 * | 8/2017 | Koizumi | H02K 11/25 |
| 10,734,869 | B2 * | 8/2020 | Kawaguchi | B62D 5/0406 |
| 10,749,404 | B2 * | 8/2020 | Degner | H02K 3/525 |
| 11,374,468 | B2 * | 6/2022 | Watari | H02K 11/25 |
| 2003/0117033 | A1 * | 6/2003 | Even | H02K 9/06 310/180 |
| 2004/0190207 | A1 * | 9/2004 | Hoppe | G01K 5/48 374/E5.03 |
| 2005/0206263 | A1 * | 9/2005 | Cai | H02K 3/14 310/201 |
| 2005/0248229 | A1 * | 11/2005 | Even | H02K 3/28 310/201 |
| 2006/0001326 | A1 * | 1/2006 | Even | H02K 15/30 310/179 |
| 2006/0163959 | A1 * | 7/2006 | Ogawa | H02K 3/38 310/201 |
| 2009/0140596 | A1 * | 6/2009 | Kaiser | H02K 3/12 310/201 |
| 2012/0086292 | A1 * | 4/2012 | Ishida | H02K 11/25 310/71 |
| 2012/0112580 | A1 * | 5/2012 | Sato | H02K 11/25 310/71 |
| 2012/0200191 | A1 * | 8/2012 | Baba | H02K 15/0432 310/201 |
| 2013/0069474 | A1 * | 3/2013 | Hamer | H02K 3/34 174/110 SR |
| 2013/0187494 | A1 * | 7/2013 | Hamer | H02K 15/35 310/201 |
| 2014/0217858 | A1 * | 8/2014 | Haruno | H02K 5/225 310/68 C |
| 2025/0202308 | A1 * | 6/2025 | Ciftcioglu | H02K 15/40 |

* cited by examiner

STATOR ASSEMBLY WITH IMPROVED STRUCTURE FOR INSTALLING SENSOR

BACKGROUND

The present invention relates to a stator assembly with an improved structure for installing a sensor that generates magnetic force through electricity, and more specifically, to a stator assembly with an improved structure for installing a sensor, which includes a sensor unit having a sensor and a component forming a stator for providing electromagnetic force in industrial fields such as automobiles, thereby minimizing defects during the manufacturing process.

In general, a stator is a device used to convert electrical energy into mechanical energy and includes a stator and a rotor. The stator is assembled by winding coils around bobbins of multiple split cores made by stacking thin iron plates and connecting the multiple split cores, on which the coils are wound, in a circular shape.

Such a general configuration of the stator is applied to various industries, including the automotive industry and other machinery industries, in diverse shapes and designs.

The stator has a center core located at the center of the bobbin, on which the coil is wound, to divide the magnetic force into the N pole and the S pole. On one side of the center core, a sensor, which detects the upper and lower positions of a plunger operating under the magnetic force of the stator, and components having various functions are installed, and the coil is wound thereon, thereby forming a stator assembly.

The conventional manufacturing processes include the steps of: installing the center core, sensor, which detects the upper and lower positions of the plunger operating under the magnetic force of the stator, and the components on one side of the center core; inserting the center core into the center of the bobbin to manufacture a stator bobbin equipped with the center core and the sensor and the components; and winding the coil around the stator bobbin to manufacture a stator through over-molding.

When the stator is manufactured through the above manufacturing process, it is difficult to check for defects in the sensor for detecting the upper and lower positions of the plunger.

Specifically, since the stator does not have means for protecting the sensor, it is more likely to cause defects during the step of inserting the center core and the bobbin, the step of winding the coil around the bobbin, the step of over-molding, and the structure may lead to poor durability and deterioration in protection against foreign substances.

Patent Document 1: Korean Patent No. 10-1141964 (granted on Apr. 25, 2012)

Patent Document 2: Korean Patent No. 10-1361391 (granted on Feb. 4, 2014)

SUMMARY OF THE INVENTION

Accordingly, the present invention has been made to solve the above-mentioned problems occurring in the prior arts, and it is an objective of the present invention to provide a stator assembly including a sensor unit composed of a sensor and a component for detecting upper and lower positions of a plunger operating under the magnetic force of a stator, thereby enhancing durability to protect the sensor and satisfying conditions to block foreign substances and check defects.

It is another objective of the present invention to provide a stator assembly with high quality by minimizing defects throughout the stator manufacturing process from the step of winding a coil around the bobbin by inserting the center core and the sensor unit into the center of the bobbin to the over-molding step.

To accomplish the above object, according to the present invention, there is provided a stator assembly with an improved structure for installing a sensor including:

- a sensor unit which includes a case body in which a sensor and a component for controlling the stator function are placed at a predetermined position and a cover sealing the case body;
- a center core which has a seating part for coupling the sensor unit; and
- a coil winding assembly which is formed by winding a coil on a bobbin where the center core is inserted into the center thereof,
- wherein in a state in which the sensor unit is coupled to the seating part of the center core of the coil winding assembly, the entire of the sensor unit is over-molded.

According to the present invention, the sensor and the component for controlling the stator function forms the single sensor unit, thereby preventing contamination by foreign substances. Moreover, the sensor unit is coupled to the seating part of the center core inserted into the center of the bobbin, thus allowing easy detection of defects in the sensor or the component.

Specifically, the coil is wound around the bobbin where the center core is inserted into the center, and then the sensor unit is assembled to prevent the sensor or the component from being damaged during the center core insertion or during the coil winding process, thereby reducing defects and enabling high-quality assembly production.

DETAILED DESCRIPTION OF THE PREFERRED EMBODIMENT

Figure 1:
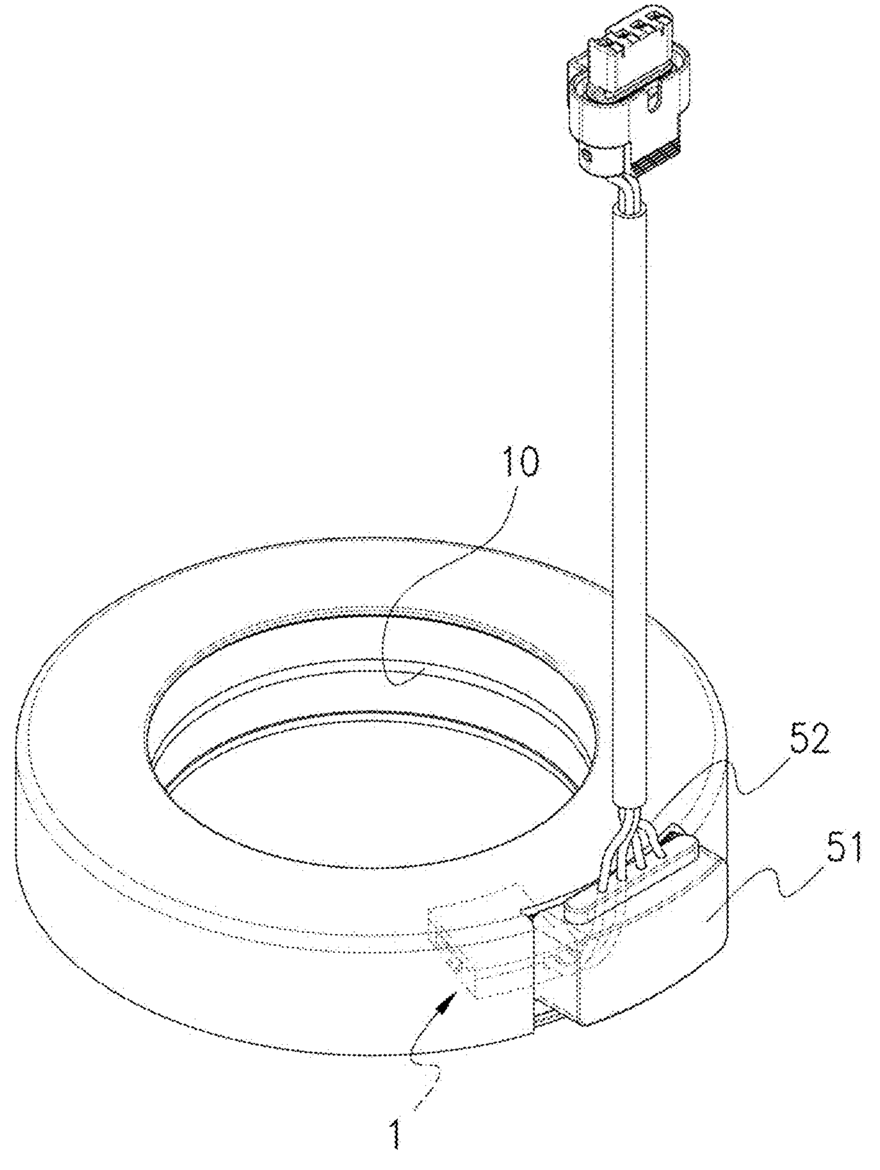
FIG. 1 is a perspective view of a stator assembly according to the present invention.
Figure 2:
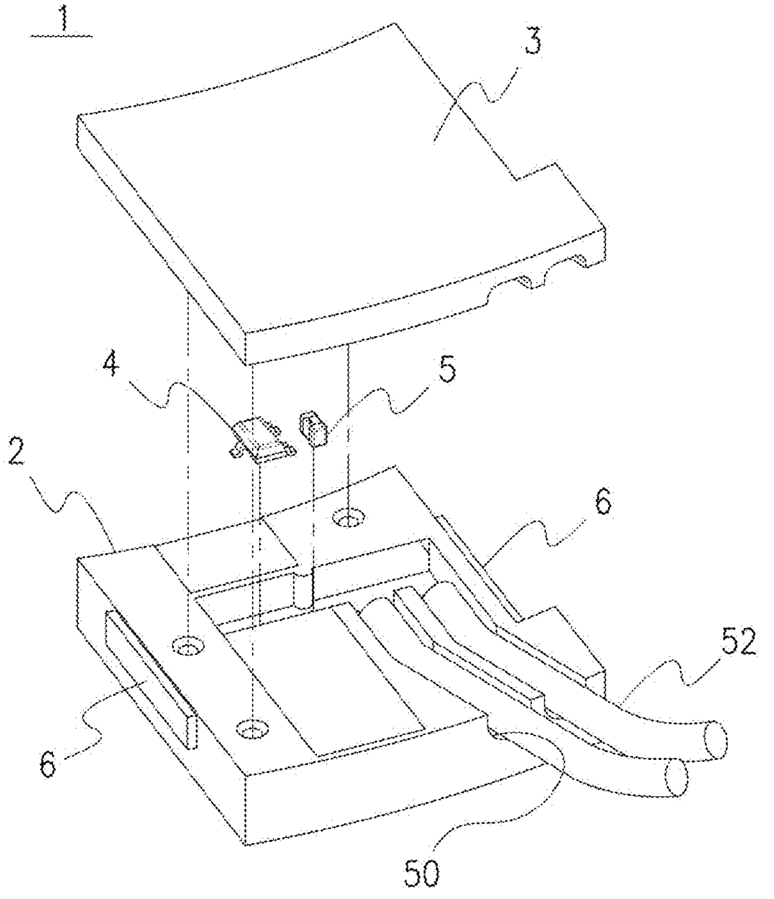
FIG. 2 is a perspective view of a sensor unit according to the present invention.
Figure 3:
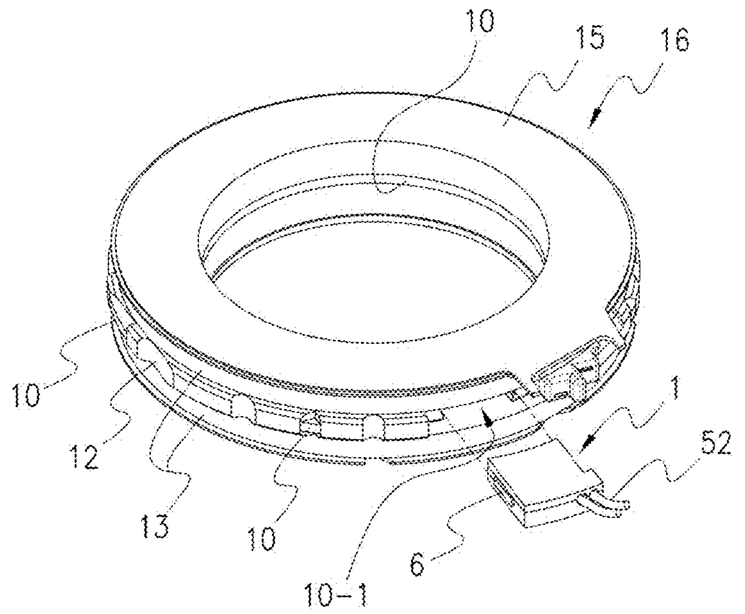
FIG. 3 is a perspective view illustrating the configuration of a bobbin of the stator assembly according to the present invention.
Figure 4:
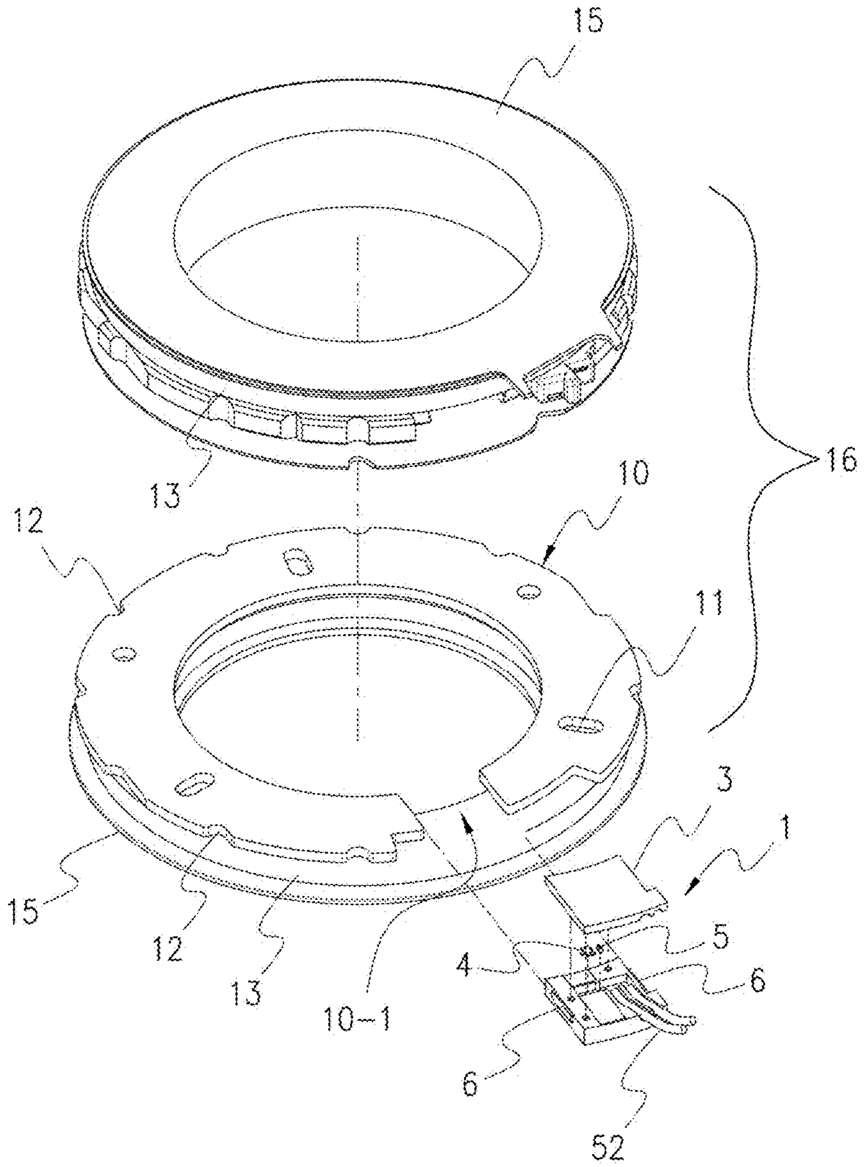
FIG. 4 is a perspective view illustrating the internal configuration of FIG. 3.
Figure 5:
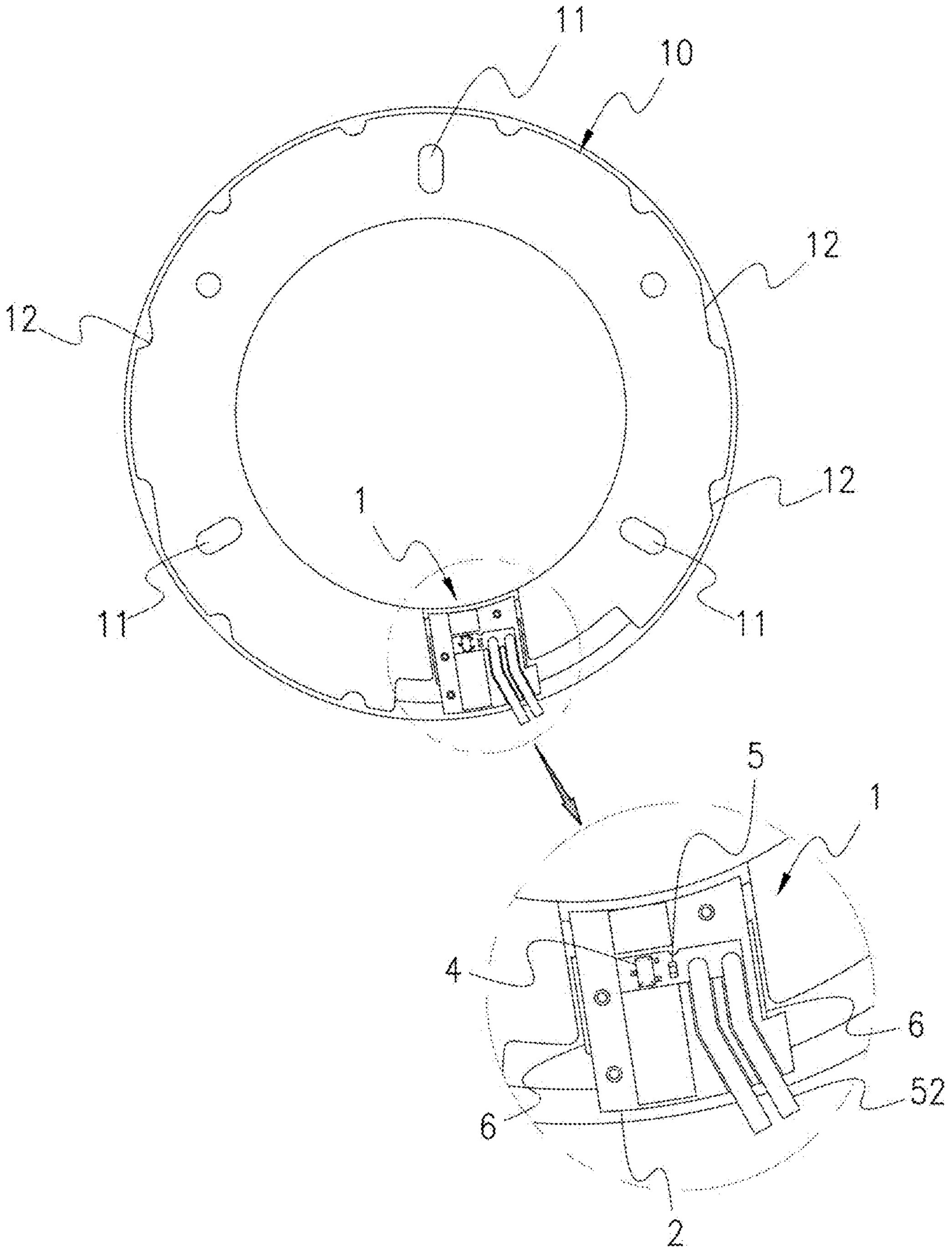
FIG. 5 is a plan view illustrating the internal configuration of the stator assembly according to the present invention.
Figure 6:
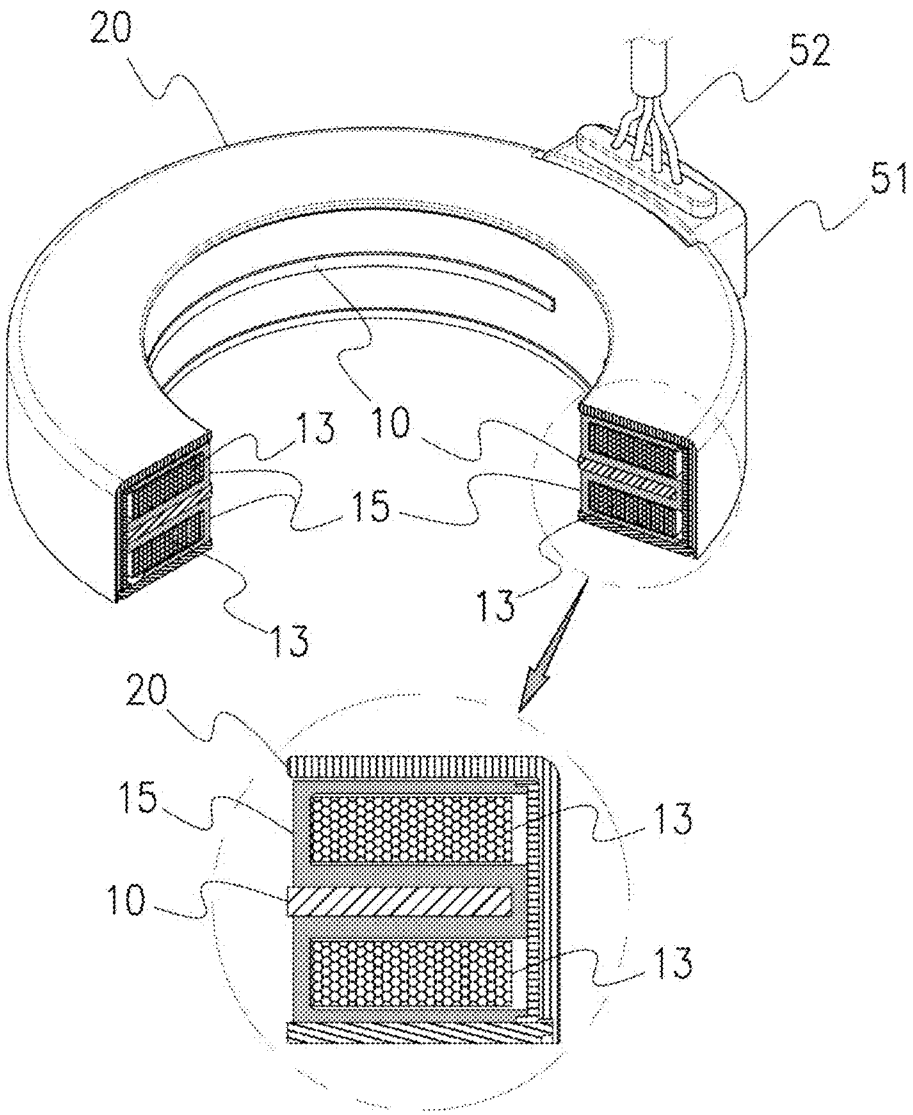
FIG. 6 is a partial sectional view of the stator assembly according to the present invention.
Figure 7:
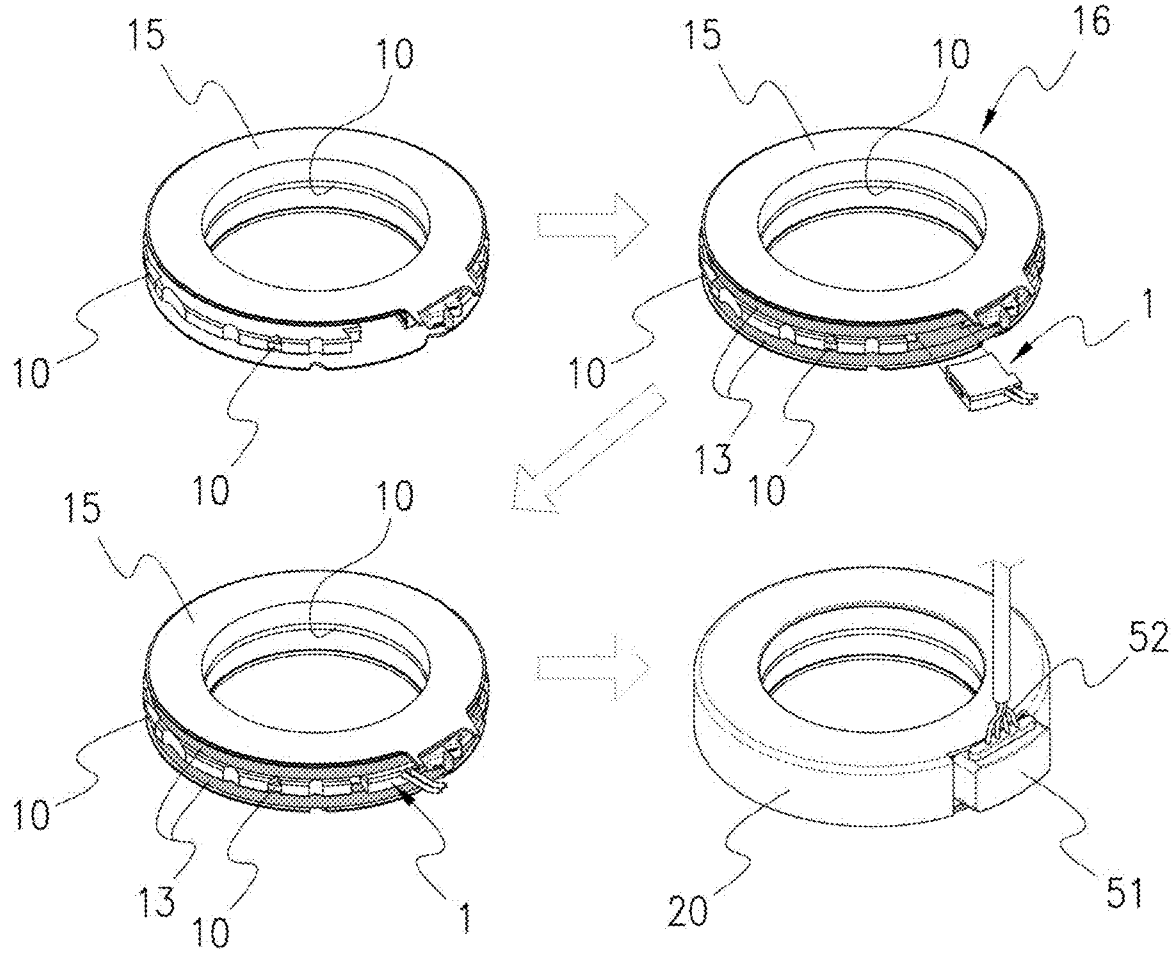
FIG. 7 is a perspective view showing a manufacturing process of the stator assembly according to the present invention.

Hereinafter, a stator assembly with an improved structure for installing a sensor according to the present invention will be described in detail based on specific embodiments. It should be understood, however, that there is no intent to limit example embodiments of the invention to the particular forms disclosed, but on the contrary, example embodiments of the invention are to cover all modifications, equivalents, and alternatives falling within the technical idea and scope of the present invention.

While the operational effects of specific configurations may not be explicitly stated, predictable effects based on the disclosed structure should be acknowledged.

The configuration of the stator assembly with an improved structure for installing a sensor according to the present invention will now be described in detail with reference to the accompanying drawings.

The stator assembly with the improved structure for installing a sensor according to the present invention includes: a case body 2 having a sensor 4 and a component 5 for controlling a stator function, which are placed at a predetermined position; a sensor unit 1 formed by combining a cover 3 sealing the case body 2; and support protrusions 6 formed at both sides of the case body 2 of the sensor unit 1 to be coupled with a seating part 10-1 of a center core 10.

The center core 10 includes the seating part 10-1 for coupling the sensor unit 1, injection holes 11 for allowing injection material to flow in during over-molding, and grooves 12 spaced on the outer circumference at even intervals.

A bobbin 15 is manufactured such that the center core is inserted into the center of the bobbin. A coil 13 is wound on both sides of the center core 10 of the bobbin 15, forming a coil winding assembly 16. A support protrusion 6 formed on the case body 2 of the sensor unit 1 is forcedly fit into the seating part 10-1 of the center core 10 forming the coil winding assembly 16.

In the state, where the sensor unit 1 is coupled to the seating part 10-1 of the center core 10 of the coil winding assembly 16, the sensor unit 1 is generally over-molded to integrate the coil winding assembly 16, thereby forming the stator assembly with the improved structure for installing the sensor.

In the drawings, reference numeral 50 indicates a wire guide groove, 51 indicates a wire terminal, and 52 indicates a lead wire.

The operation of the stator assembly with the improved structure for installing the sensor according to the present invention will be described in detail as follows.

First, the sensor 4 for checking upper and lower movement distances of the plunger, and a component 5 having various functions are placed at designated positions inside the case body 2. The sensor unit 1 which is sealed with the cover 3 can prevent contamination by foreign substances during the storage, assembly, and transportation of the sensor unit 1. Furthermore, since the sensor and other components are integrated into a single sensor unit 1, such a configuration facilitates handling such as transportation and assembly, and allows checking of defects in the sensor 4 at any time.

Additionally, when the center core 10 is inserted into the center of the bobbin 15 and over-molded through the injection holes 11 formed in the center core 10, since the injection material is interconnected through the injection holes 11, the center core 10 and the bobbin 15 are robustly integrated into a single structure.

Specifically, the coil winding assembly 16 is formed by winding the coil 13 on both sides of the center core 10, which is inserted into the center of the bobbin 15, and the sensor unit 1 is coupled to the seating part 10-1 of the center core 10 of the coil winding assembly 16, thus preventing damage to the sensor 4 and the component 5 having various functions during the process of winding the coil on the bobbin 15.

Moreover, since the support protrusions 6 formed on the case body 2 of the sensor unit 1 are forcedly fit into the seating part 10-1 of the center core 10, the structure can prevent the sensor unit 1 from being shaken or dislocated during the process of manufacturing the coil winding assembly and the process of over-molding the coil winding assembly 16, so that the sensor unit 1 can perfectly perform the sensor function at the accurate position of the seating part 10-1 formed on the center core without error.

Now, a method for manufacturing the stator assembly with the improved structure for installing the sensor according to the present invention will be described.

The method for manufacturing the stator assembly with the improved structure includes:

a step of seating a sensor and a component, which control the function of a stator, at a predetermined position, and manufacturing a sensor unit 1 including a case body 2 having support protrusions formed at both sides and a cover for sealing the case body;

a step of preparing a seating part 10-1 for coupling the sensor unit, and manufacturing the center core 10 having injection holes 11 and grooves 12 formed on the outer circumference at even intervals;

a step of manufacturing a bobbin 15 in such a manner that the center core 10 manufactured by the above step is inserted into the center of the bobbin;

a step of winding a coil 13 at both sides from the center of the center core 10 of the manufactured bobbin 15 to manufacture a coil winding assembly 16 on which the coil is wound;

a step of coupling the sensor unit 1 to the seating part 10-1 of the center core 10 inserted into the center of the bobbin of the coil winding assembly 16; and a step of putting the coil winding assembly 16 into a mold frame and performing over-molding, such that the stator assembly with the improved structure for installing the sensor is manufactured.

What is claimed is:

1. A stator assembly with an improved structure for installing a sensor comprising:

a center core which includes a seating part for coupling a sensor unit, injection holes allowing injection material to flow in during over-molding, and grooves formed on the outer circumference at even intervals;

a coil winding assembly which includes a bobbin formed in such a manner that the center core is inserted into the center of the bobbin and a coil wound on both sides of the center core inserted into the center of the bobbin; and a sensor unit which is installed on the seating part of the center core installed at the center of the coil winding assembly to control the stator function, wherein in a state in which the sensor unit is coupled to the seating part of the center core of the coil winding assembly, the entire of the sensor unit is over-molded.

2. The stator assembly according to claim 1, wherein the sensor unit comprises a case body, a sensor and a component placed at a predetermined position of the case body, and a cover sealing the case body.

3. The stator assembly according to claim 2, wherein support protrusions are formed at both sides of the case body of the sensor unit to be coupled to the seating part of the center core.

* * * * *